(12) United States Patent
Chen et al.

(10) Patent No.: US 8,170,312 B2
(45) Date of Patent: May 1, 2012

(54) RESPIRATORY MOTION COMPENSATED CARDIAC WALL MOTION DETERMINATION SYSTEM

(75) Inventors: Jinghua Chen, Schaumburg, IL (US); Shailaja Merugu, Carpentersville, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 327 days.

(21) Appl. No.: 12/472,514

(22) Filed: May 27, 2009

(65) Prior Publication Data

US 2010/0208957 A1    Aug. 19, 2010

Related U.S. Application Data

(60) Provisional application No. 61/073,108, filed on Jun. 17, 2008.

(51) Int. Cl.
*A61B 5/05*          (2006.01)
(52) U.S. Cl. ........................................ 382/128; 600/484
(58) Field of Classification Search .................. 382/128; 600/484, 434
See application file for complete search history.

(56) References Cited

U.S. PATENT DOCUMENTS

| | | | |
|---|---|---|---|
| 3,993,995 A | 11/1976 | Kaplan et al. | |
| 4,727,882 A | 3/1988 | Schneider et al. | |
| 5,630,422 A | 5/1997 | Zanakis et al. | |
| 7,471,975 B2 * | 12/2008 | Barbour | 600/473 |

OTHER PUBLICATIONS

Sanders Data Systems. *How QLVA Works.*, http://www.sandersdata.com/QLVATech.htm#Why%20Do%20We%20Perform%20Quantitative%20Left-Ventricular%20Angiography?, May 14, 2009.

Alexander G et al. *Effect of Mechanically Simulated Diaphragmatic Respiratory Motion on Myocardial SPECT Processed With and Without Attenuation Correction.* Journal of Nuclear Medicine vol. 43 No. 9 1259-1267, © 2002 by Society of Nuclear Medicine http://jnm.snmjournals.org/cgi/content/abstract/43/9/1259.
Collins, S.M, Kerber, R.E., Skorton, D.J. *Computer applications in angiography: Quantitative Analysis of Left Ventricular Regional Function by Imaging Methods.* Cardiac imaging and image processing. McGraw-Hill Book Company. New York, 1986, pp. 232-233.
Sheehan, F.H. *Advantages and applications of the centerline method for characterizing regional ventricular function.* Circulation, 74(2), 1986, pp. 293-305.
Ingels, M.B., Mead, C.W., Daughters, G.T., Stinson, E.B., Aldeman, E.L. *A new method for assessment of left ventricular wall motion.* Comput. Cardiol. IEEE, 57, 1978.
Klabunde, Richard E. Ph.D., Cardiovascular Physiology Concepts, ECG Introduction, Apr. 6, 2007, http://www.cvphysiology.com/Arrhythmias/A009.htm.

* cited by examiner

*Primary Examiner* — Joseph Chang
(74) *Attorney, Agent, or Firm* — Alexander J Burke

(57) ABSTRACT

A cardiac wall motion compensation system quantitatively compares images acquired at different phases of cardiac and respiratory movement and excludes motion contributed by respiratory movement. A system compensates for respiratory motion induced tissue displacement in cardiac wall motion determination. The system includes an imaging device for acquiring multiple sequential cardiac images of a patient and a data processor. The data processor processes data representing first and second images selected from the multiple sequential cardiac images, to determine heart wall respiratory motion representative displacement from a ventricle wall positional difference indicated between the first and second images, in response to a respiratory motion representative signal and a heart electrophysiological signal. The data processor subtracts heart wall respiratory motion representative displacement from a heart wall displacement measurement to provide a respiration compensated heart wall displacement value.

20 Claims, 9 Drawing Sheets

RESPIRATORY MOTION COMPENSATED CARDIAC WALL MOTION DETERMINATION SYSTEM

This is a non-provisional application of provisional application Ser. No. 61/073,108 filed Jun. 17, 2008, by J. Chen et al.

FIELD OF THE INVENTION

This invention concerns a system for compensating for respiratory motion induced tissue displacement in cardiac wall motion determination involving calculating heart wall respiratory motion representative displacement.

BACKGROUND OF THE INVENTION

Measurement of heart left ventricle (LV) wall motion is used to assess human cardiac function condition. A known procedure for determining left ventricle wall motion involves imaging a patient heart (using an X-ray, MR or CT system, for example). A contrast agent is usually injected into a heart chamber to allow visualization of blood volume in a two-dimensional (2D) multi-frame image sequence (angiogram) provided by an imaging system, with each frame corresponding to a time point in the sequence. A physician visualizes the image sequence at a computer and selects one frame with the smallest LV volume and one frame with the largest LV volume. These two frames roughly correspond to end-systolic (ES) and end-diastolic (ED) phases of the heart cycle. Alternatively, the two frames may be automatically selected by employing an ECG signal acquired during the image sequence acquisition and image data processing using graphical ventricle edge detection within images, for example. Known image analysis applications may be used to analyze the two selected frames and compute quantitative data of the LV functions, one of which is wall motion. The wall motion is calculated by measuring the displacement of the cardiac wall between the two frames. Since the movements at different locations of the LV wall are non uniform, the LV wall is further divided into segments. The displacement at each segment is compared against data collected from a normal population. Well known methods for assessing cardiac wall motion include regional wall motion, centerline wall motion and radial wall motion comparison, for example.

Wall motion indicates how effectively heart muscle contracts and indicates the health of the heart. However, a 2D LV angiogram used for wall motion analysis not only contains motion caused by heart contraction, but also other motion such as breathing, or respiratory motion and patient movement. Since respiratory motion varies significantly between people and between image sequence acquisitions, it introduces inaccuracy in the calculation of wall motion of a patient and inaccuracy in comparison with predetermined population data and comparison with previous image sequence acquisitions of the same patient. Known systems employ different methods of compensating a wall motion calculation for respiratory motion. One method involves asking a patient to hold his/her breath for the duration of an imaging scan. However, this is a problem if the duration of the scan is longer than a breath-hold duration and some patients cannot hold their breath due to illness or age. Other known methods involve detection of a position change of a reference object at different respiratory phases. The reference object is usually placed around diaphragm or abdominal area of the patient, because the motion around these areas is mostly caused by breathing. However, it is difficult to choose the right position of the reference object so that the displacement of the reference object mirrors respiratory motion induced LV wall motion displacement. Another known method involves acquiring images only at the time where respiratory motion is the least. This is achieved by gating image acquisition at a desired respiratory phase with a respiratory signal provided by a respiration monitoring device. However this potentially results in a longer image sequence acquisition time.

Another known system used to remove respiratory motion from heart wall motion in X-ray images, for example, uses a simplified assumption that respiratory motion is only vertical movement (from head to toe). The respiratory motion is calculated by using the vertical movement of the diaphragm, for example. However this assumes different parts of the body move the same amount and in the same direction in response to respiration. It is known however, that even different sections of the diaphragm move in different directions. A system according to invention principles addresses the identified deficiencies and associated problems.

SUMMARY OF THE INVENTION

A system improves accuracy of cardiac wall motion assessment in heart LV image acquisition in response to an ECG signal and a respiratory signal by quantitatively comparing images acquired at different phases of cardiac and respiratory movement and excluding motion contributed by respiratory movement. A system compensates for respiratory motion induced tissue displacement in cardiac wall motion determination. The system includes an imaging device for acquiring multiple sequential cardiac images of a patient and a data processor. The data processor automatically processes data representing first and second images selected from the multiple sequential cardiac images, to determine heart wall respiratory motion representative displacement from a ventricle wall positional difference indicated between the first and second images, in response to a respiratory motion representative signal and a heart electrophysiological signal. The data processor automatically subtracts heart wall respiratory motion representative displacement from a heart wall displacement measurement to provide a respiration compensated heart wall displacement value.

DETAILED DESCRIPTION OF THE INVENTION

A system improves accuracy of cardiac wall motion assessment in an

X-ray LV angiogram (or in cardiac imaging by other modalities such as MR, CT or Ultrasound, for example). The system analyzes X-ray LV images using synchronized ECG signals and respiratory displacement signals acquired during acquisition of the LV images. The system quantitatively compares images acquired at different phases of cardiac and respiratory cycles and excludes motion contributed by respiratory movement to improve accuracy of LV wall motion assessment. The system improves accuracy of wall motion calculation by removing respiratory motion which is particularly important when wall motion data of a patient is compared with wall motion data of a normal population or previous wall motion data of the same patient, since respiratory motion varies between people based on demographic differences including age, weight, height and gender. The removal of respiratory motion displacement enables assessment of true cardiac wall motion.

The system advantageously uses the left ventricle respiratory motion itself in a compensation calculation rather than using respiratory motion in other parts of the body. The calculation is not affected by an abnormal or non regular respiratory cycle, because it is retrospective in character and is of particular use when a patient has an irregular respiratory cycle. The system in one embodiment is integrated with an LV angiogram procedure and is largely automatically performed by an executable application as a background function.

Figure 1:
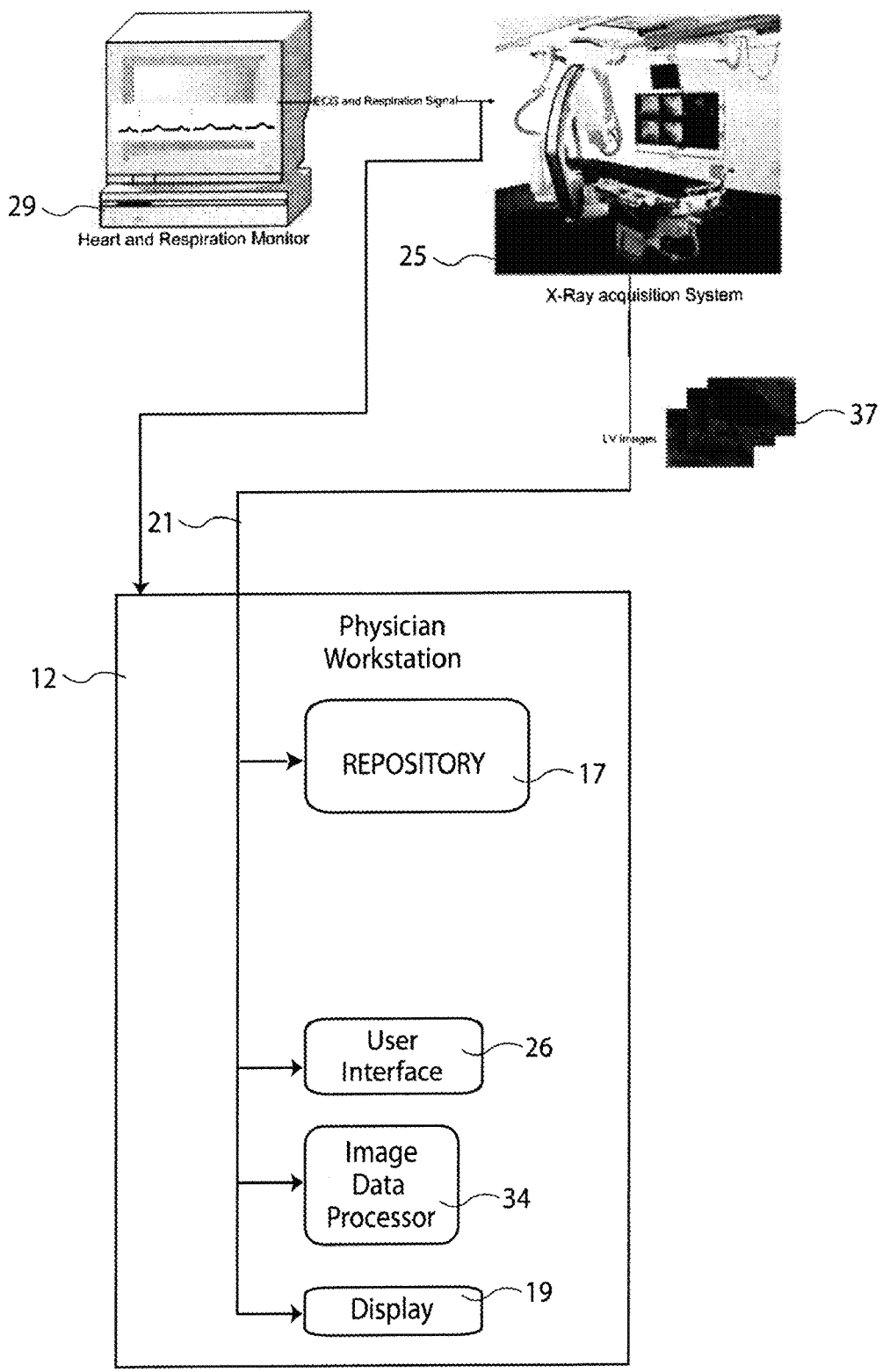
FIG. 1 shows a system for compensating for respiratory motion induced tissue displacement in cardiac wall motion determination, according to invention principles.

FIG. 1 shows system 10 for compensating for respiratory motion induced tissue displacement in cardiac wall motion determination. System 10 includes one or more processing devices (e.g., workstations, computers or portable devices such as notebooks, Personal Digital Assistants, phones) 12 that individually include a user interface 26 enabling user interaction with a Graphical User Interface (GUI) and display 19 supporting GUI and image presentation in response to predetermined user (e.g., physician) specific preferences. Processing device 12 also includes at least one repository 17, image data processor 34 and image data processor 34. As well as device 12, system 10 also includes imaging device 25 (e.g., an X-ray imaging system, MR system, CT scan system or Ultrasound system) and heart and respiratory monitor 29 intercommunicating via network 21. Display 19 of processing device 12 presents display images comprising a GUI. At least one repository 17 stores medical image studies for patients in DICOM compatible (or other) data format. A medical image study individually includes multiple image series of a patient anatomical portion which in turn individually include multiple images.

Imaging device 25 acquires multiple sequential cardiac images 37 of a patient. Image data processor 34 processes data representing first and second images selected from the multiple sequential cardiac images, to determine heart wall respiratory motion representative displacement. Processor 34 does this from a ventricle wall positional difference indicated between the first and second images, in response to a respiratory motion representative signal and a heart electrophysiological signal provided by heart and respiratory monitor 29. Processor 34 subtracts the heart wall respiratory motion representative displacement from a heart wall displacement measurement to provide a respiration compensated heart wall displacement value. Thereby system 10 excludes the effect of respiratory motion in the calculation of LV wall motion. Therefore assessment of heart muscle condition is more accurate when motion caused by heart contraction, excluding respiratory motion, is calculated.

Figure 2:
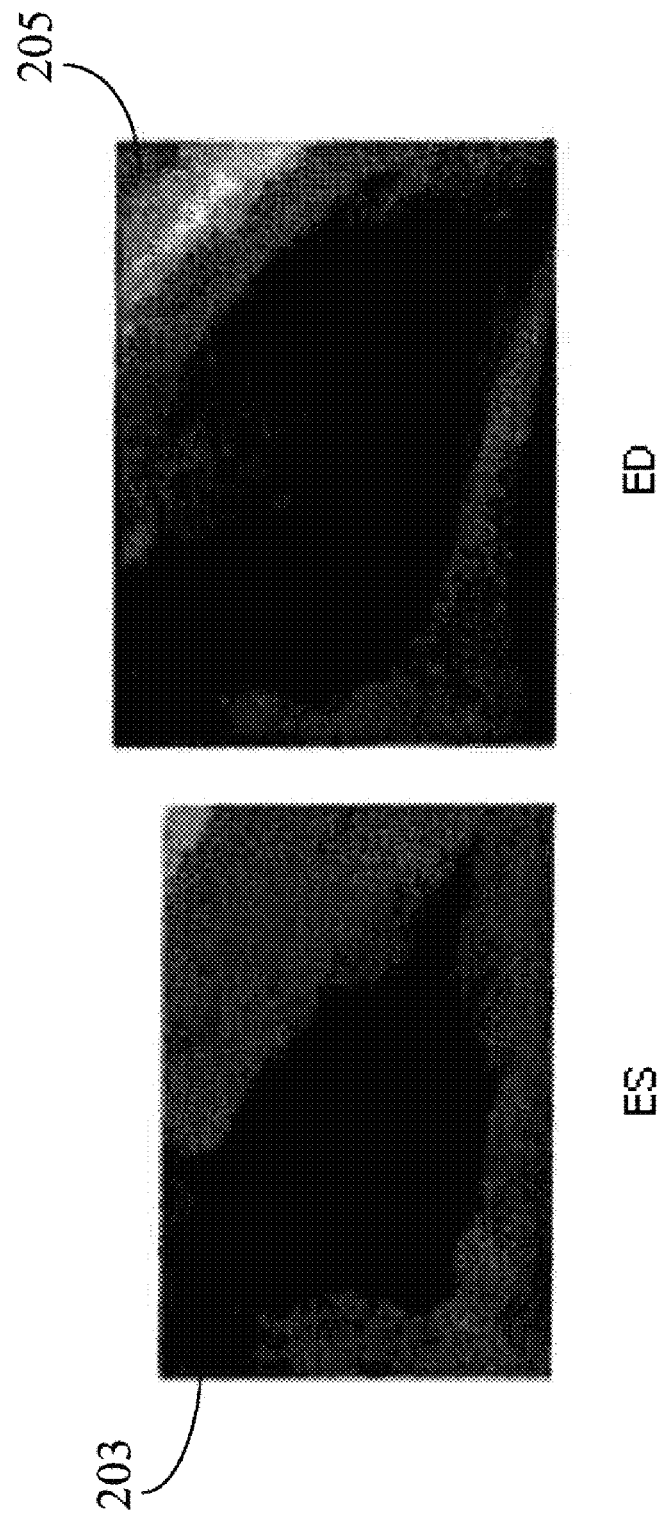
FIG. 2 illustrates end-systolic (ES) and end-diastolic (ED) images.

System 10 uses an X-ray imaging system 25 connected to heart and respiration cycle monitoring system 29 that acquires ECG and respiratory signals during X-ray imaging acquisition. An image scan is performed synchronized with ECG and respiratory signals. System 10 acquires an image frame with the smallest blood volume (denoted as an ES frame) illustrated by image 203 of FIG. 2 and acquires an image frame with the largest blood volume (denoted as an ED frame) illustrated by image 205 of FIG. 2. ED image frame 205 and ES image frame 203 are selected from multiple image frames acquired by imaging system 25. The selection is performed automatically by image data processor 34 by known image analysis methods using LV boundary detection, for example. The selection may alternatively be performed manually by physician visual inspection, for example.

Figure 3:
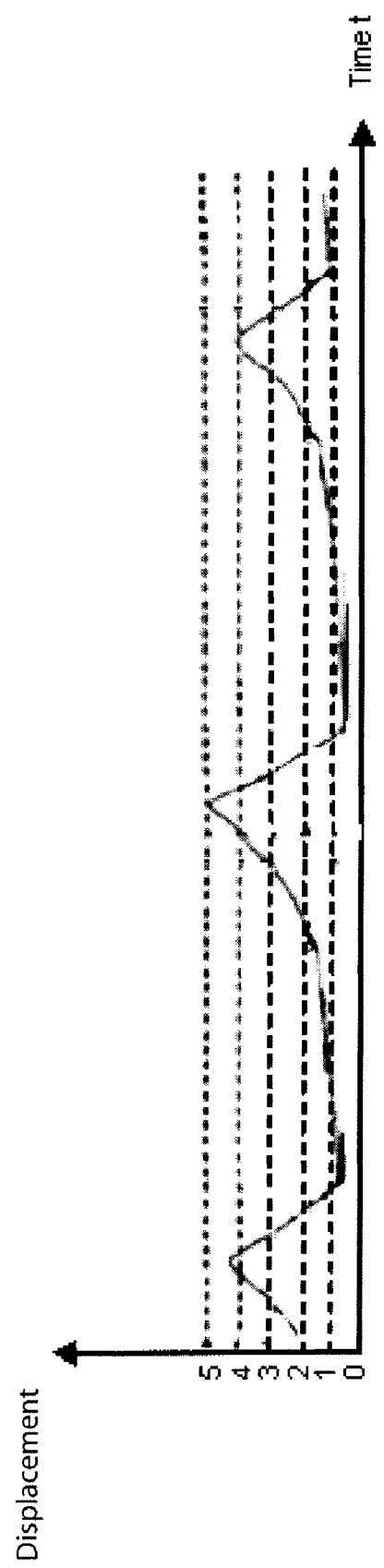
FIG. 3 shows a curve of respiratory displacement versus time, according to invention principles.

One of multiple different known methods (e.g., an abdominal sensor) is used to monitor respiratory motion of a human body. The motion is derived from fluctuation of airflow, lung volume and pressure inside the lung and diaphragm activities during the respiratory cycle. The abdominal wall movement is monitored in one embodiment with a sensor. FIG. 3 shows a curve of respiratory displacement versus time derived using sensor detected abdominal wall movement from a reference point. The respiratory displacement data is processed to fall within a scale of 0-5, for example but in other embodiments another scale may be used. In one embodiment, the respiratory displacement scale is determined by equally dividing the difference between the highest point on the curve and the lowest point on the curve to fall within the desired number of increments. An optimum scale may be derived based on displacement data from a population of patients and may be categorized based on patient demographic characteristics including age, weight, height and gender, for example. Displacement points falling within the same scale interval (e.g. between 0 and 1) are considered to have the same respiratory motion.

Figure 4:
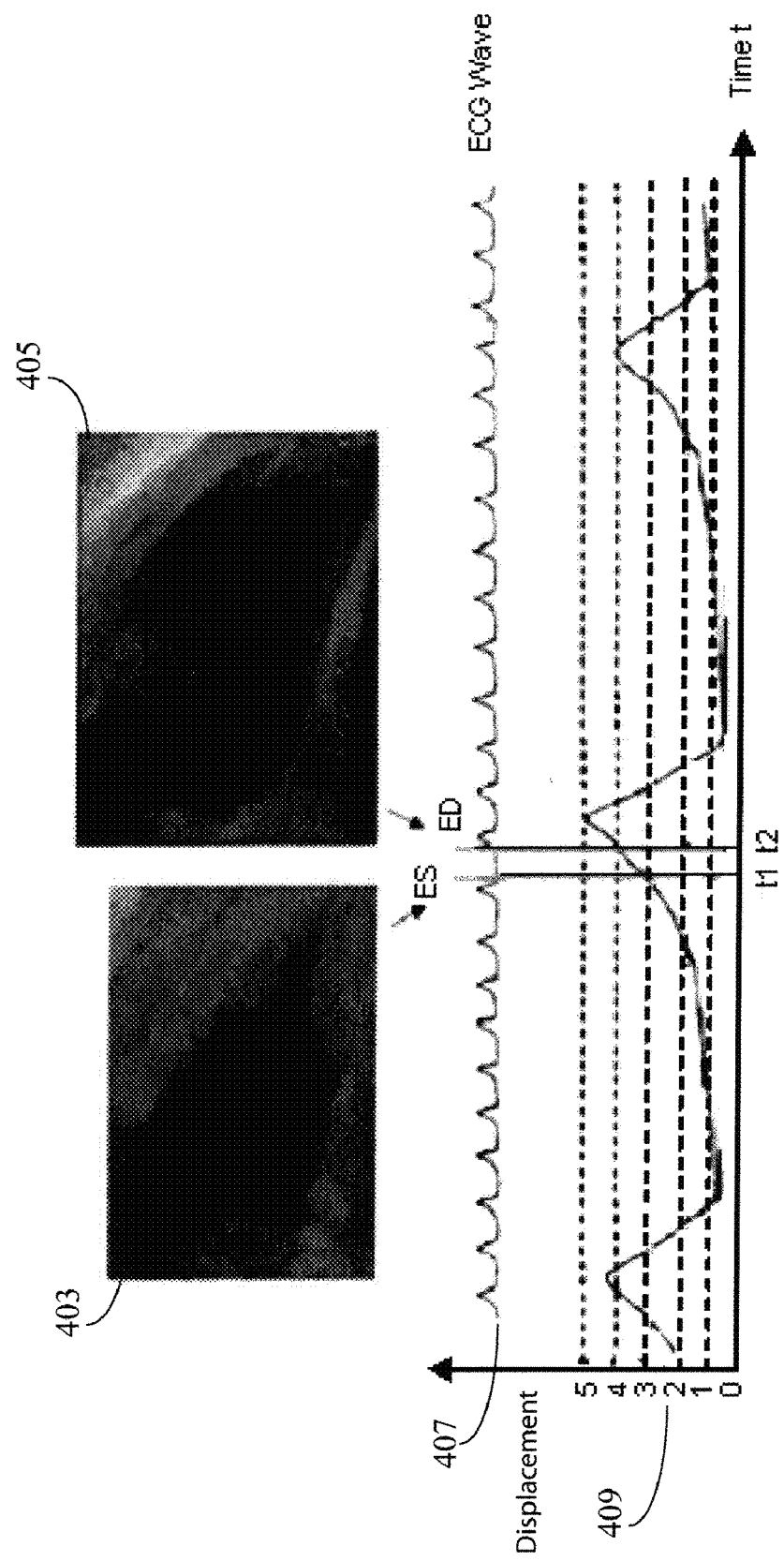
FIG. 4 shows end-systolic (ES) and end-diastolic (ED) images and associated respiratory displacement derived from a displacement curve, according to invention principles.

System 10 (FIG. 1) synchronizes image acquisition with ECG signals and the respiratory displacement curve of FIG. 3. FIG. 4 shows end-systolic (ES) and end-diastolic (ED) images and associated respiratory displacement indicated in displacement curve 409 and synchronized with ECG signal 407. ES image frame 403 and ED image frame 405 are acquired at time t1 and t2 respectively. Respiratory displacement curve 409 indicates at t1, the scaled displacement is 3 and at t2, the scaled displacement is 4 so that ES image frame 403 has a respiratory displacement scale value of 3 and ED image frame 405 has a respiratory displacement scale value of 4.

Figure 5:
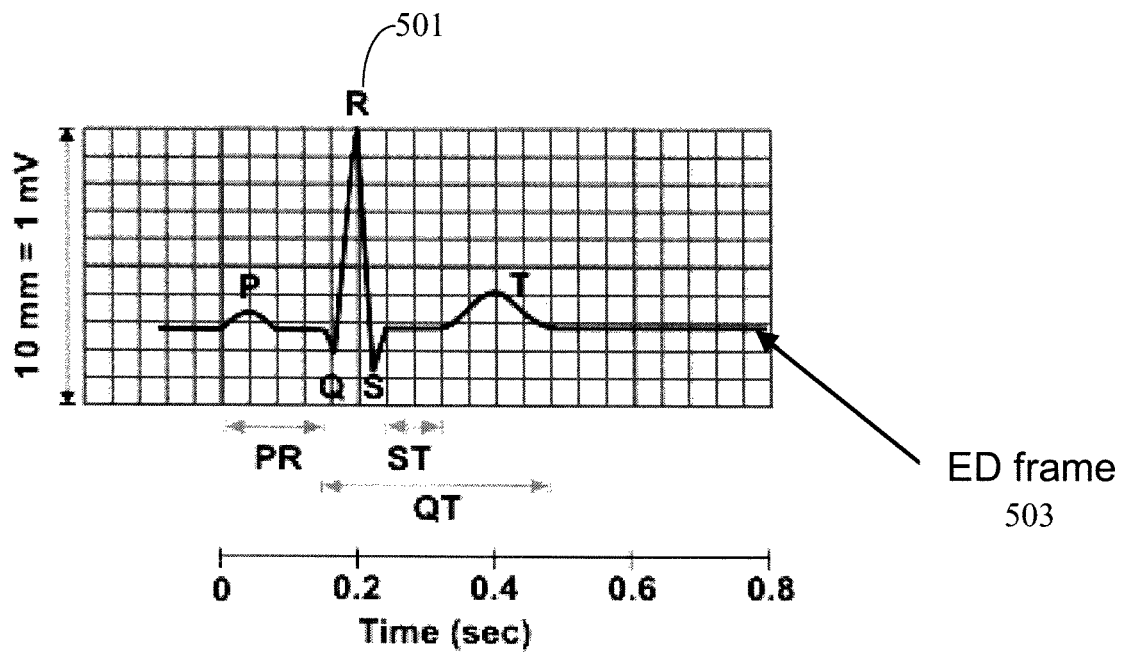
FIG. 5 shows an ECG signal of one heart beat cycle.
Figure 6:
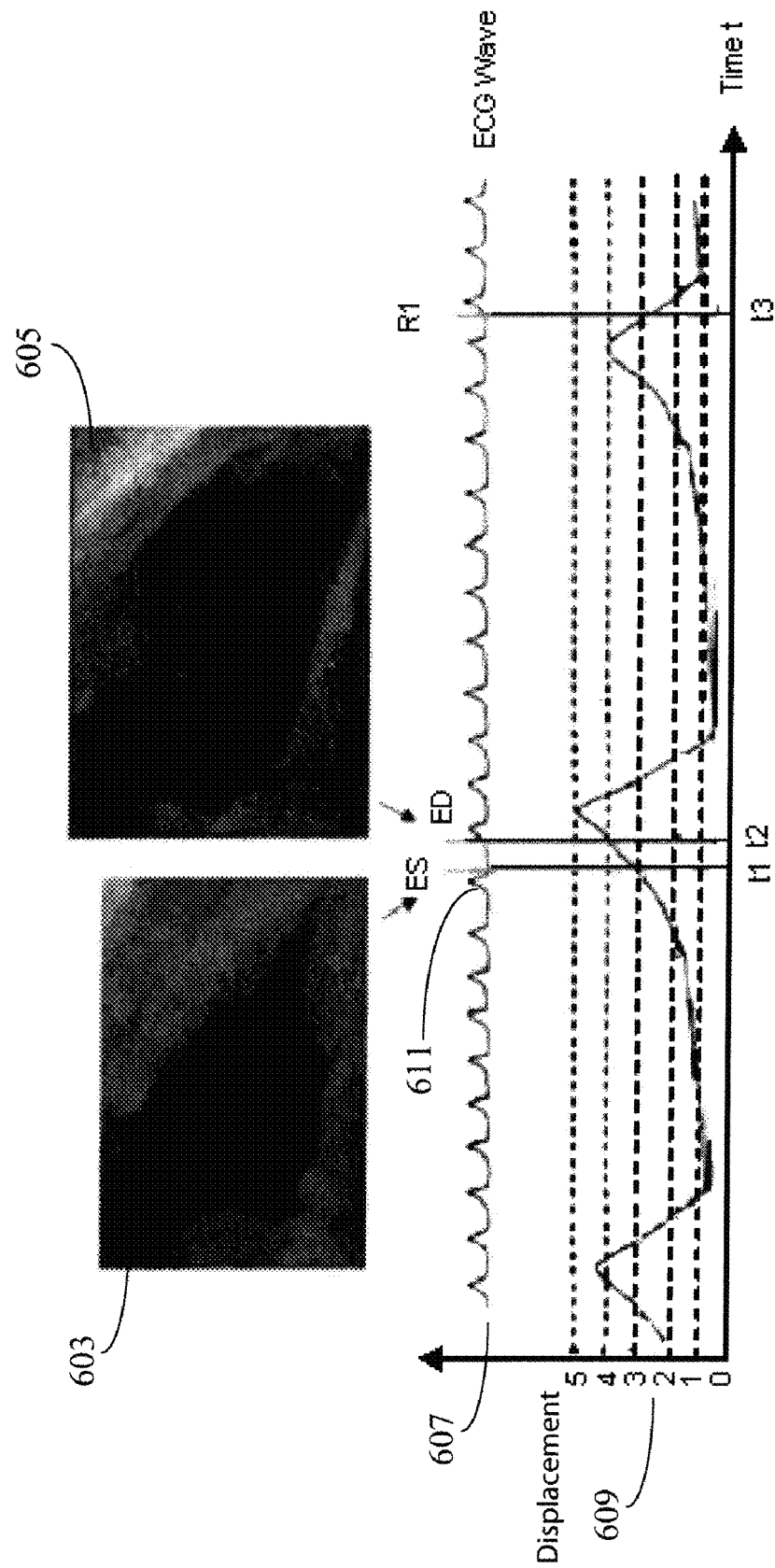
FIG. 6 illustrates identification of an R1 image in response to ECG and respiratory displacement waveforms, according to invention principles.

FIG. 6 illustrates identification of an R1 image in response to ECG and respiratory displacement waveforms and its relationship to end-systolic (ES) and end-diastolic (ED) images. Image data processor 34 (FIG. 1) selects from a sequence of image acquired in an imaging scan by system 25, an image frame (denoted as image frame R1) that has the same respiratory displacement scale value (value of 3) as ES image frame 603 as indicated in displacement curve 609 of FIG. 6 and selects an image frame (denoted as image frame R2) that has the same respiratory displacement scale value (value of 4) as ED image frame 605. Both R1 and R2 image frames are located at a similar (and substantially motionless) phase of the heart cycle as indicated by ECG signal 607. ED image frame 605 is used as an R2 image frame as it is acquired at a relatively motionless phase of the heart cycle. Image data processor 34 finds an R1 image frame by locating image frames that lie at the same heart cycle point (phase) as an R2 (ED) frame as indicated by ECG signal 607. FIG. 5 shows an ECG signal of one heart beat cycle presenting R-wave 501 and indicating heart cycle point 503 at which an ED image frame is acquired.

Continuing with FIG. 6, it is determined that a manually selected ED image frame 605 on the ECG curve at t2, is 0.6 sec after immediately preceding R peak 611. Image data processor 34 searches ECG waveform 607 and identifies multiple candidate ED image frames that are acquired at a 0.6 sec delay after each respective preceding R peak. These identified candidate ED image frames are considered W occur at substantially the same phase of the heart cycle. An ED image frame is selected from the candidate ED image frames to have the same respiratory displacement scale value (value of 3) as the ES image frame and is denoted as an R1 image frame. The ED image frame acquired at t3 satisfies the criteria to be an R1 image frame, because it has a motion scale of 3, which is the same as the ES image frame and it is located at the same heart phase on the ECG curve as an ED image frame.

Figure 7:
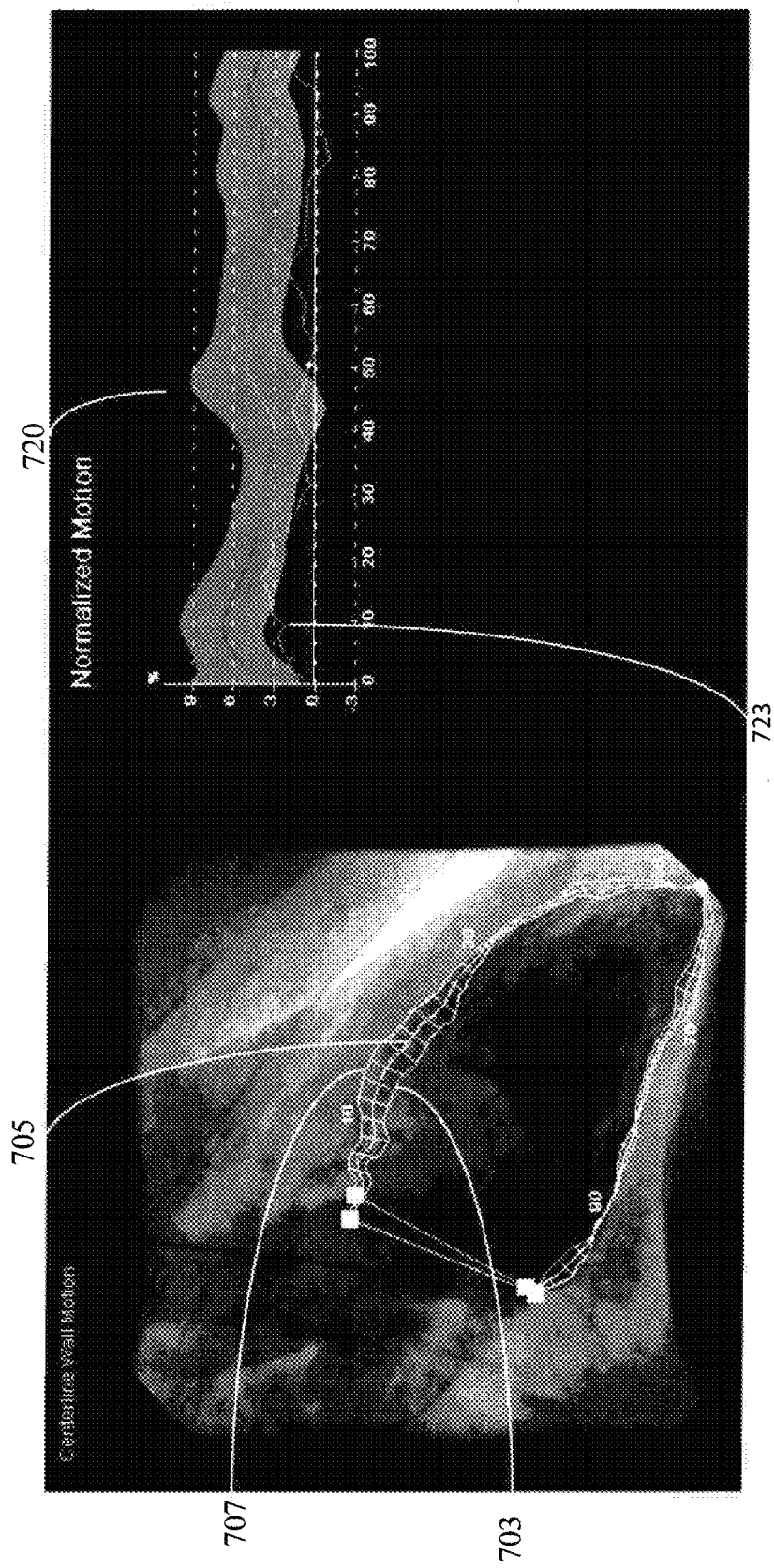
FIG. 7 illustrates graphical identification of cardiac wall segment displacement induced by the respiratory motion displacement, according to invention principles.

FIG. 7 illustrates graphical identification of cardiac wall segment displacement induced by the respiratory motion displacement. Processes to determine displacement of a cardiac wall between two X-ray image frames are known and typically determine the displacement by finding the same point on a cardiac wall in the two image frames respectively and by measuring the distance between the points. Image data processor 34 computes displacement of multiple individual cardiac wall segments between R1 and R2 image frames using a known centerline model, for example. FIG. 7 shows three LV contours. The inner most contour 703 is a boundary of the LV in the R1 image frame. The outer most contour 707 is the boundary of the LV in the R2 image frame. These contours may be manually traced by a physician or in another embodiment automatically detected by image data processor 34 using a known executable application employing a luminance transition edge detection function, for example. Middle contour 705 is a centerline between R1 and R2 contours 703 and 705 as used by a centerline model for determining LV boundary segment displacement. Vertical chords are drawn perpendicular to the centerline as shown. The two end points of each vertical chord are considered to be the same point on the LV wall. Image data processor 34 measures the length of each vertical chord to provide respiratory motion induced displacement of each cardiac wall segment between R1 and R2 image frames. The respiratory motion induced displacement comprises displacement substantially exclusively caused by respiratory motion, since R1 and R2 image frames are selected with relatively little heart motion. The amount of the displacement is also approximately the same as the amount of respiratory motion induced displacement between ES and ED image frames, since the R1 and R2 image frames (although both ED frames) are selected with the same respiratory motion scale value as ES and ED image frames respectively. In the following equation, $D_R$ denotes displacement of a cardiac wall segment caused by respiratory motion. $P_{R1}$ and $P_{R2}$ denote position of a cardiac wall segment at R1 and R2 frames respectively.

$$D_R = |P_{R1} - P_{R2}|$$

In Normalized displacement graph 720, the x axis represents the different regions of the LV wall. The y axis represents the displacement of the LV wall normalized against the outer most contour. The graph, at region 10 indicates the respiratory motion induced displacement 723 is approximately 2%.

Figure 8:
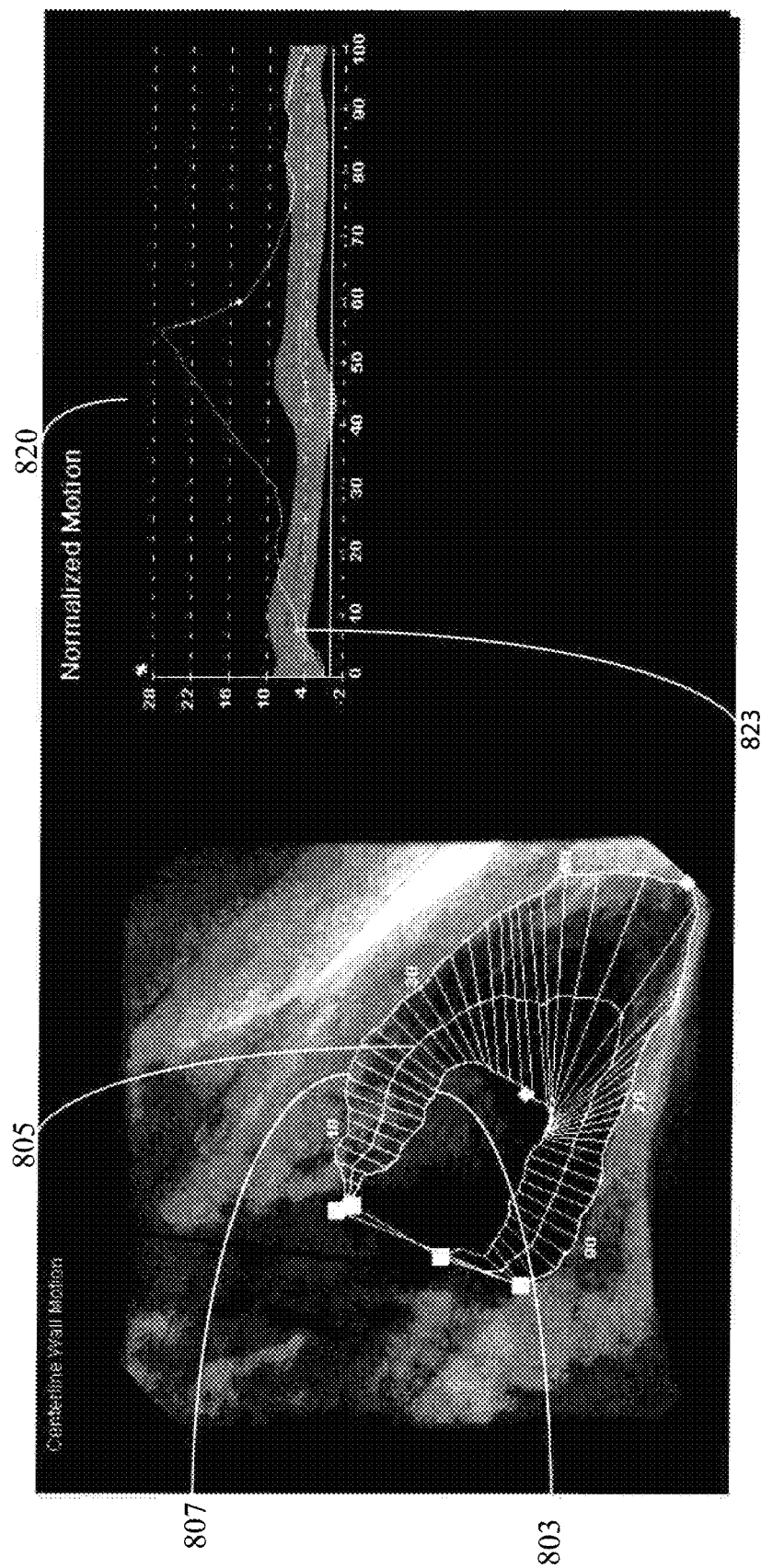
FIG. 8 illustrates graphical identification of total wall motion between ED and ES images including cardiac and respiratory motions, according to invention principles.

FIG. 8 illustrates graphical identification of total wall motion between ED and ES images including cardiac and respiratory motions. Image data processor 34 employs the centerline model to compute displacement of individual cardiac LV wall segments between ES and ED image frames. Inner most contour 803 is a boundary of the LV wall in the ES image frame. Outer most contour 807 is a boundary of the LV wall on the ED image frame. Middle contour 805 is a centerline between ES and ED contours 803 and 807 as used by the centerline model for determining LV boundary segment displacement. Vertical chords are drawn perpendicular to the centerline as shown. The two end points of each vertical chord are considered to be the same point on the LV wall. Image data processor 34 measures the length of each vertical chord to provide a cardiac and respiratory motion induced displacement of each cardiac wall segment between ES and ED image frames.

In Normalized displacement graph 820, the x axis represents the different regions of the LV wall. The y axis represents the displacement of the LV wall normalized against the outer most contour. The graph indicates the cardiac motion induced displacement 823 between ES and ED image frames at region 10, is approximately 6%. In the following equation, $D_T$ denotes total motion displacement of the cardiac wall including cardiac and respiratory motion induced displacement. This includes respiratory motion displacement and cardiac motion displacement. $P_{ES}$ and $P_{ED}$ denotes position of cardiac wall boundary segments of ES and ED image frames respectively.

$$D_T = |P_{ES} - P_{ED}|$$

Image data processor 34 subtracts respiratory motion induced displacement from total motion induced displacement $D_T$ to obtain the displacement exclusively caused by cardiac motion.

$$D_C = D_T - D_R$$

In Normalized displacement graph 820, the graph indicates the cardiac motion induced displacement between ES and ED image frames at region 10, exclusive of respiratory motion induced displacement, is approximately 4% (6%-2%). The steps involved in determining respiratory motion induced displacement and calculating and correcting cardiac wall displacement for respiratory motion displacement are achieved automatically by system 10 comprising an image data post processing computer system. However, a user may need to manually trace a boundary of the cardiac wall in order for the system to get the position of the cardiac wall in different image frames. This is because automatic boundary determination using known applications may not be reliable due to the resolution of an X-ray angiogram.

System 10 involves additional components in performing a normal 2D X-ray LV angiogram procedure in a hospital, for example. System 10 includes ECG and Respiratory Signal acquisition unit 29 connected to X-ray acquisition system 25 and system 10 captures both ECG and Respiratory Signals at a synchronized start point with the image capture, in X-ray imaging. System 10 processes images and the ECG and Respiratory signals to remove respiratory motion for wall motion calculation in performing LV function analysis, for example. The system may be integrated into an LV function analysis executable application. The automated system enables a user to perform LV function analysis without deviation from a present workflow.

Figure 9:
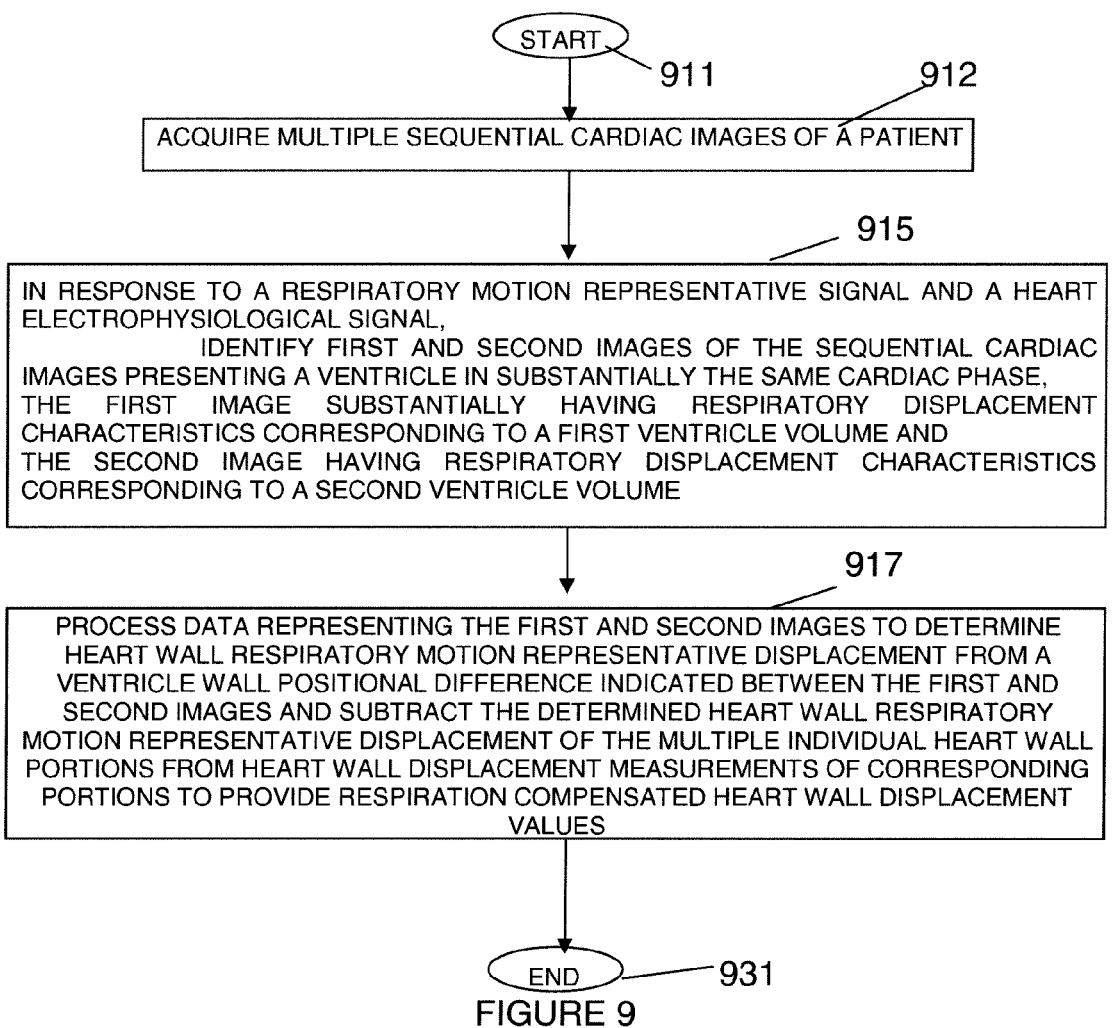
FIG. 9 shows a flowchart of a process used by a system for compensating for respiratory motion induced tissue displacement in cardiac wall motion determination, according to invention principles.

FIG. 9 shows a flowchart of a process used by system 10 for compensating for respiratory motion induced tissue displacement in cardiac wall motion determination. Imaging system 25 acquires multiple sequential cardiac images of a patient in step 912 following the start in step 911. Image data processor 34 in step 915, in response to a respiratory motion representative signal and a heart electrophysiological signal, identifies first and second images of the sequential cardiac images presenting a ventricle in substantially the same cardiac phase. Image data processor 34 identifies the first image in the sequential cardiac images as having an anatomical positional displacement substantially the same as an image substantially showing a minimum ventricle volume and being acquired at substantially the same position within a heart cycle as determined using the electrophysiological signal. The anatomical positional displacement is derived from a respiratory curve presenting a scale of respiratory displacement plotted against time.

The first image has respiratory displacement characteristics substantially corresponding to a first ventricle volume and the second image has respiratory displacement characteristics substantially corresponding to a second ventricle volume. The first ventricle volume is a minimum ventricle volume and the respiratory displacement characteristics corresponding to a minimum ventricle volume comprise an anatomical positional displacement occurring substantially at an End-Systolic (ES) cardiac phase. The second ventricle volume is a maximum ventricle volume and respiratory displacement characteristics corresponding to a maximum ventricle volume comprise an anatomical positional displacement occurring substantially at an End-Diastolic (ED) cardiac phase. The first and second images substantially comprise End-Diastolic (ED) images acquired in different heart cycles but at substantially the same position within a heart cycle, for example.

In step 917, image data processor 34 processes data representing the first and second images to determine heart wall respiratory motion representative displacement from a ventricle wall positional difference indicated between the first and second images. Image data processor 34 processes data representing the first and second images to determine heart wall respiratory motion representative displacement of multiple individual heart wall portions from ventricle wall positional differences indicated between the first and second images using a graphical boundary detection method. Image data processor 34 also performs a heart wall displacement measurement using a graphical boundary detection method. Image data processor 34 subtracts the determined heart wall respiratory motion representative displacement of the multiple individual heart wall portions from heart wall displacement measurements of corresponding portions to provide respiration compensated heart wall displacement values. The process of FIG. 9 terminates at step 931.

A processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a controller or microprocessor, for example, and is conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry, or software or a combination of both for generating display images or portions thereof. A user interface comprises one or more display images enabling user interaction with a processor or other device.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A user interface (UI), as used herein, comprises one or more display images, generated by a user interface processor and enabling user interaction with a processor or other device and associated data acquisition and processing functions.

The UI also includes an executable procedure or executable application. The executable procedure or executable application conditions the user interface processor to generate signals representing the UI display images. These signals are supplied to a display device which displays the image for viewing by the user. The executable procedure or executable application further receives signals from user input devices, such as a keyboard, mouse, light pen, touch screen or any other means allowing a user to provide data to a processor. The processor, under control of an executable procedure or executable application, manipulates the UI display images in response to signals received from the input devices. In this way, the user interacts with the display image using the input devices, enabling user interaction with the processor or other device. The functions and process steps herein may be performed automatically or wholly or partially in response to user command. An activity (including a step) performed automatically is performed in response to executable instruction or device operation without user direct initiation of the activity.

The system and processes of FIGS. 1-9 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The system for compensating for respiratory motion induced tissue displacement in cardiac wall motion determination may be used with other imaging modalities, such as CT or MR systems, for use in performing an LV angiogram, for example. Further, the processes and applications may, in alternative embodiments, be located on one or more (e.g., distributed) processing devices on the network of FIG. 1. Any of the functions and steps provided in FIGS. 1-9 may be implemented in hardware, software or a combination of both.

What is claimed is:

1. A system for compensating for respiratory motion induced tissue displacement in cardiac wall motion determination, comprising:

an imaging device for acquiring a plurality of sequential cardiac images of a patient; and an image data processor for, processing data representing first and second images selected from said plurality of sequential cardiac images presenting a ventricle in substantially the same cardiac phase, to determine heart wall respiratory motion representative displacement from a ventricle wall positional difference indicated between the first and second images, in response to a respiratory motion representative signal and a heart electrophysiological signal and subtracting said heart wall respiratory motion representative displacement from a heart wall displacement measurement to provide a respiration compensated heart wall displacement value.

2. A system according to claim 1, wherein said image data processor determines heart wall respiratory motion representative displacement by identifying said first and second images of said sequential cardiac images presenting a ventricle in substantially the same cardiac phase, said first image substantially having respiratory displacement characteristics corresponding to a minimum ventricle volume and said second image having respiratory displacement characteristics corresponding to a maximum ventricle volume.

3. A system for determining respiratory motion induced tissue displacement in a heart wall motion, comprising:

an imaging device for acquiring a plurality of sequential cardiac images of a patient; and an image data processor for, in response to a respiratory motion representative signal and a heart electrophysiological signal, identifying first and second images of said sequential cardiac images presenting a ventricle in substantially the same cardiac phase, said first image having respiratory displacement characteristics substantially corresponding to a first ventricle volume, said second image having respiratory displacement characteristics substantially corresponding to a second ventricle volume and processing data representing said first and second images to determine heart wall respiratory motion representative displacement from a ventricle wall positional difference indicated between the first and second images.

4. A system according to claim 3, wherein
said first ventricle volume is a minimum ventricle volume.

5. A system according to claim 4, wherein
said second ventricle volume is a maximum ventricle volume.

6. A system according to claim 3, wherein
said first and second images substantially comprise End-Diastolic (ED) images acquired in different heart cycles but at substantially the same position within a heart cycle.

7. A system according to claim 3, wherein
said first and second images comprise images acquired in different heart cycles at a substantially motionless point within a heart cycle.

8. A system according to claim 3, wherein
said first and second images are acquired at a cardiac phase having relatively little heart motion in different heart cycles but at substantially the same position within a heart cycle.

9. A system according to claim 3, wherein
said first ventricle volume is a minimum ventricle volume and said respiratory displacement characteristics corresponding to a minimum ventricle volume comprise an anatomical positional displacement occurring substantially at an End-Systolic (ES) cardiac phase.

10. A system according to claim 3, wherein
said second ventricle volume is a maximum ventricle volume and
said respiratory displacement characteristics corresponding to a maximum ventricle volume comprise an anatomical positional displacement occurring substantially at an End-Diastolic (ED) cardiac phase.

11. A system according to claim 3, wherein
said anatomical positional displacement is derived from a respiratory curve presenting a scale of respiratory displacement plotted against time.

12. A system according to claim 3, wherein
said image data processor subtracts said heart wall respiratory motion representative displacement from a heart wall displacement measurement to provide a respiration compensated heart wall displacement value.

13. A system according to claim 3, wherein
said image data processor identifies said first image in said sequential cardiac images as having an anatomical positional displacement substantially the same as an image substantially showing a minimum ventricle volume and being acquired at substantially the same position as the ED frame within a heart cycle as determined using the electrophysiological signal.

14. A system according to claim 3, wherein
said image data processor processes data representing said first and second images to determine heart wall respiratory motion representative displacement of a plurality of individual heart wall portions from ventricle wall positional differences indicated between the first and second images.

15. A system according to claim 14, wherein
said image data processor subtracts the determined heart wall respiratory motion representative displacement of said plurality of individual heart wall portions from heart wall displacement measurements of corresponding portions to provide respiration compensated heart wall displacement values.

16. A system according to claim 14, wherein
said image data processor processes data representing said first and second images to determine heart wall respiratory motion representative displacement of a plurality of individual heart wall portions using a graphical boundary detection method.

17. A system according to claim 14, wherein
said image data processor performs a heart wall displacement measurement using a graphical boundary detection method.

18. A system for compensating for respiratory motion induced tissue displacement in cardiac wall motion determination, comprising:

an imaging device for acquiring a plurality of sequential cardiac images of a patient;

an image data processor for, in response to a respiratory motion representative signal and a heart electrophysiological signal, identifying first and second images of said sequential cardiac images presenting a ventricle in substantially the same cardiac phase,
   said first image substantially having respiratory displacement characteristics corresponding to a minimum ventricle volume and
   said second image having respiratory displacement characteristics corresponding to a maximum ventricle volume,
processing data representing said first and second images to determine heart wall respiratory motion representative displacement from a ventricle wall positional difference indicated between the first and second images and
subtracting said heart wall respiratory motion representative displacement from a heart wall displacement measurement to provide a respiration compensated heart wall displacement value.

19. A method for compensating for respiratory motion induced tissue displacement in cardiac wall motion determination, comprising the activities of:
   acquiring a plurality of sequential cardiac images of a patient;
   processing data representing first and second images selected from said plurality of sequential cardiac images presenting a ventricle in substantially the same cardiac phase, to determine heart wall respiratory motion representative displacement from a ventricle wall positional difference indicated between the first and second images, in response to a respiratory motion representative signal and a heart electrophysiological signal; and
   subtracting said heart wall respiratory motion representative displacement from a heart wall displacement measurement to provide a respiration compensated heart wall displacement value.

20. A method according to claim 19, including the activities of
   determining heart wall respiratory motion representative displacement by,
      identifying said first and second images of said sequential cardiac images presenting a ventricle in substantially the same cardiac phase,
         said first image substantially having respiratory displacement characteristics corresponding to a minimum ventricle volume and
         said second image having respiratory displacement characteristics corresponding to a maximum ventricle volume.

\* \* \* \* \*